Patented Nov. 16, 1943

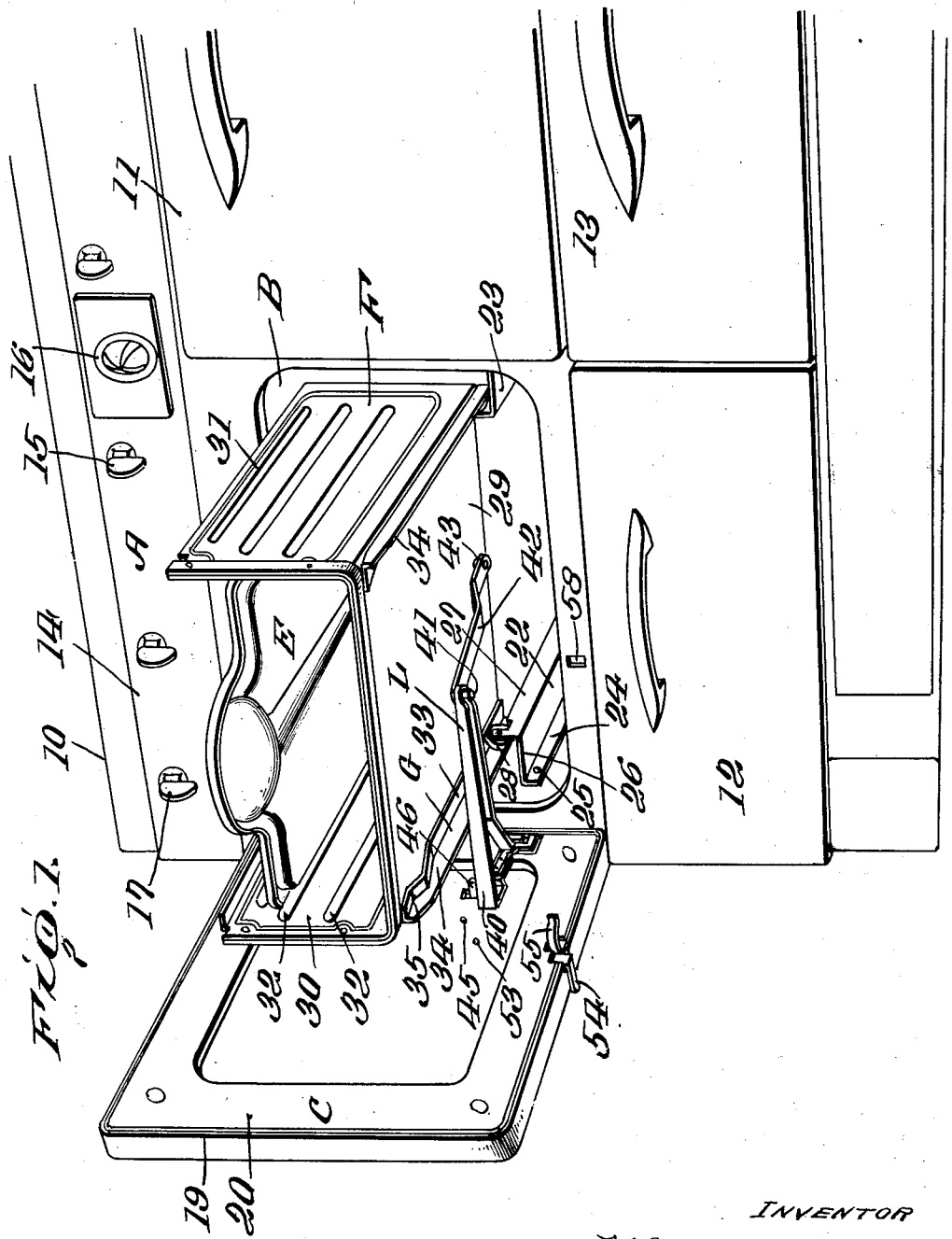

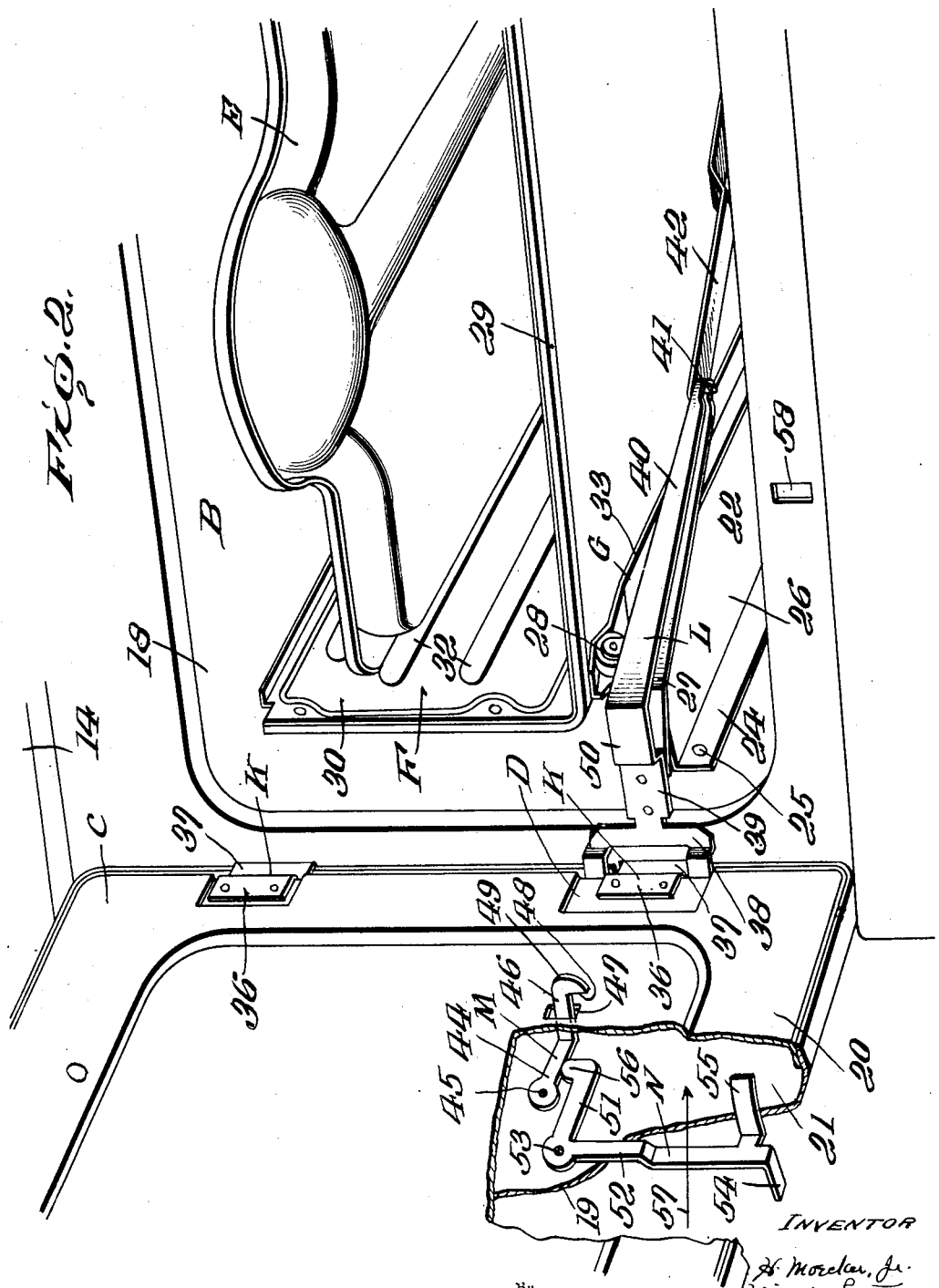

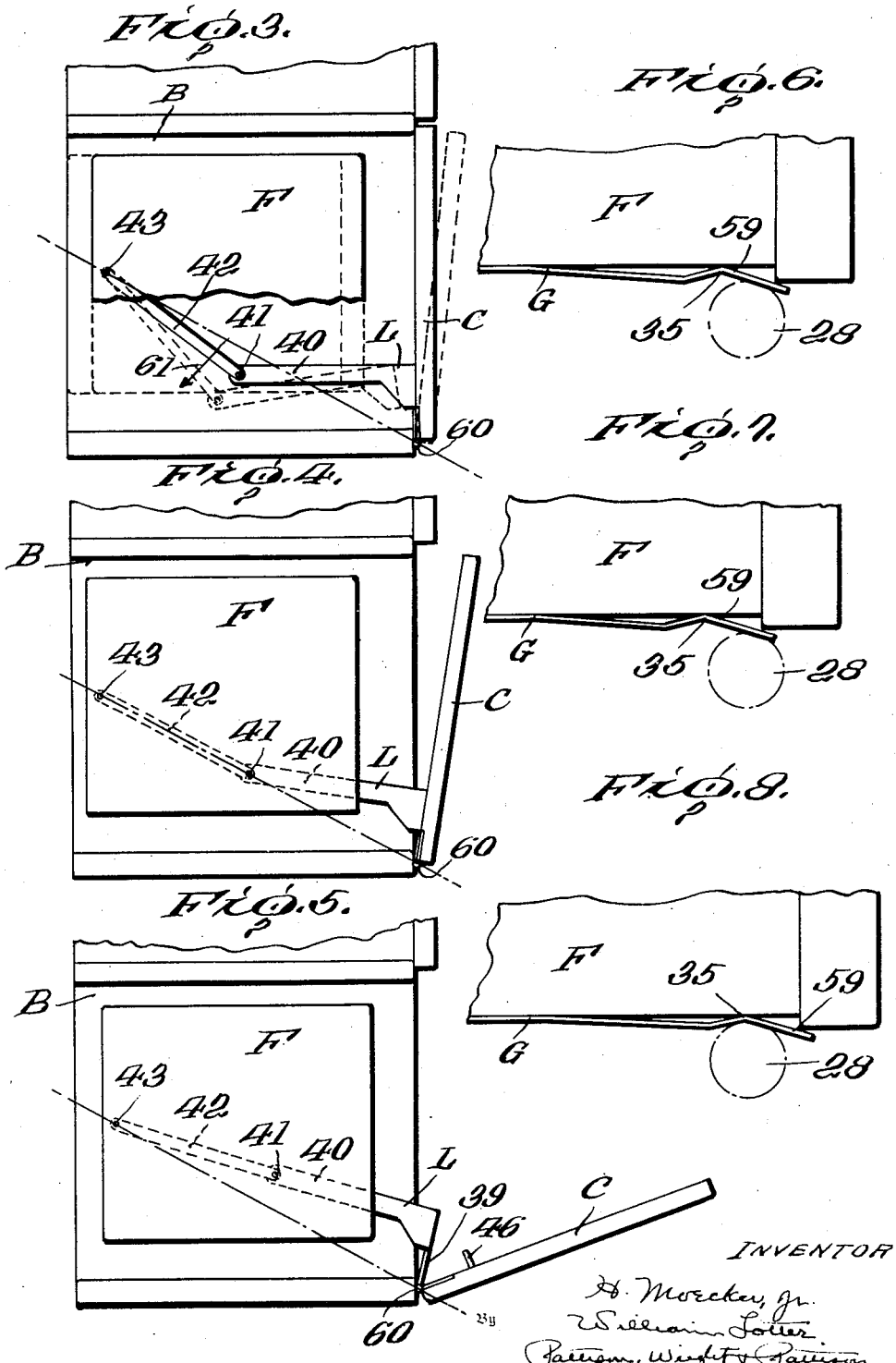

2,334,641

UNITED STATES PATENT OFFICE 2,334,641

OVEN BROILER CONSTRUCTION

Henry Moecker, Jr., and William Lotter, Cleveland, Ohio, assignors to American Stove Company, St. Louis, Mo., a corporation of New Jersey Application February 9, 1940, Serial No. 318,152

19 Claims. (Cl. 126—340)

The present invention pertains particularly to and has as its primary object the provision of an improved pull-out broiler and in using the word broiler we refer to a broiler pan or grid or to the combination of a grid or pan with a carrier.

Another object of the invention is the provision of a pull-out broiler pan or grid in combination with a broiler oven the door of which is mounted to swing in a horizontal plane.

A still further object of the invention is the provision of a broiler pan or grid in combination with a broiler oven having a door mounted to swing in a horizontal plane with the arrangement being such that the broiler pan or grid may optionally be left within or pulled out from the broiler oven when the oven door is opened.

A still further object of the invention is the provision of a pull-out broiler pan or grid in combination with a broiler oven which arrangement is such that the broiler grid or pan utilizes the greatest possible broiling area of the broiling oven.

In the provision of a device having the foregoing attributes and which accomplishes the foregoing results many novel features of construction are utilized and the specific nature of these will appear from the following description when read in the light of the accompanying drawings.

In the drawings:

Figure 1 is a view in front elevation of a cooking range having a broiling oven provided with the present improved pull-out broiler grid or pan, the broiler oven door being illustrated in open position with the broiler grid being moved into an outwardly extended position in respect to the broiler oven chamber.

Figure 2 is an enlarged detail view in front elevation of the front end of the broiler oven of the range, the oven door being shown in an open position and the broiler pan being positioned wholly within the oven chamber.

Figures 3 to 8 inclusive are diagrammatic views illustrating the positions assumed by the broiler pan or grid carrier when the same is detached from the oven door to permit movement of said door independent of the carrier.

It is to be recognized and it will be understood that the cooking ranges to which the present invention may be applied need not be of any specific construction nor need they be heated by burners of any specific construction or which burn any specific type of fuel.

In the drawings the range A is illustrated as being a conventional gas range having a conventional cooking top portion 10 below which is positioned the broiler oven or chamber B. The range has also a baking oven disposed behind the door 11 and beneath the broiler oven and baking oven the range is provided with pull-out storage drawers or the like 12 and 13. The cooking top burners are in a burner chamber the front end of which is closed by a suitable panel 14 along the front of which are disposed the individual gas cock handles 15 which provide a means of manually controlling the delivery of fuel to said burners. A setting dial 16 of a thermostatic regulator is also conveniently positioned upon the front panel 14. One of the cock handles, as for instance 17, will control the supply of fuel to the burner (not shown) which is provided within the upper end of the broiling oven B as is of course conventional of gas fired broiling ovens.

The broiling oven B at its front is provided in accordance with general practice, with an open end 18 which is closed by the broiler oven door C.

The broiler door is made up of a front panel 19 and a rear liner panel 20 arranged in telescopic relationship to provide between them a chamber 21 which in an insulated type of range is ordinarily filled with some suitable insulating material. In this instance the oven door is mounted upon suitable hinges so as to swing in a horizontal plane when moved from an open to a closed position, or vice versa, and inasmuch as one of the hinges upon which the door is supported is constructed in a particular and specific manner the exact nature of which will be hereinafter described it is referred to in this instance only generally by designating it by the reference letter D.

A pair of tracks 22 and 23 are oppositely disposed within and adjacent the bottom of the broiler oven and suitably supported on the inner side walls thereof to be disposed in substantially a horizontal plane. Each of these tracks has a vertically disposed side leg or flange 24 through which pass suitable securing means 25 for securing the tracks to the side walls of the oven. Each track additionally has an inwardly extending and horizontally disposed leg portion 26 the inner edge of which is turned up to provide a vertical flange or leg 27 which at its front end carries a roller 28.

In the particular adaptation of the invention which I have selected to illustrate the broiler grid is in the form of a pan E which is slidable out from and adjustable in a suitable tray or carrier F. This carrier is of a U-shape in cross section and comprises a bottom 29 and oppositely disposed upwardly extending side walls 30 and 31 on the inner faces of which are positioned bulges 32 or the like to provide supports for the broiler pan E. These supports or trackways for the pan E make it possible to pull the pan outwardly from its carrier and to adjust the pan upwardly and downwardly within the carrier so as to selectively position the pan nearer to or further from the broiler burner in the upper end of the broiler oven.

A track G is positioned on the under side of the carrier bottom 29 and extends longitudinally of each side edge thereof. These tracks have a horizontal flange portion 33 and a vertical flange portion 34. The horizontal flange of the tracks abut and are secured to the bottom of the carrier and constitute a runway for the aforementioned track rollers 28. It will be seen that with the parts in their operative positions the rollers 28 are disposed between the vertical legs 27 of the tracks carried by the side walls of the broiler oven and the vertical legs 34 of the tracks carried by the bottom of the broiler pan carrier F.

Closely adjacent their forward ends each of the horizontal legs 33 of the tray-carried tracks G is crimped to form at its under side a pocket-like indenture 35 the exact and specific purpose of which will be hereinafter described.

The broiler door is supported to swing in a horizontal plane upon a pair of conventionally constructed hinges designated as an entirety at K. One leaf 36 of these hinges is suitably secured to the door as for instance to the inner liner panel 20 thereof and is pivotally supported upon a suitable pintle, not shown, which would be within the portion 37 of the hinge.

From the description thus far given it will be apparent that the broiler pan or grid carrier or drawer F can be slid inwardly and outwardly through the door opening at the front of the broiler oven and that during this movement the carrier would be guided by the interlocking tracks and that the rollers 28 will facilitate the ease with which the drawer or carrier can be moved inwardly and outwardly. It will also be readily seen that the broiler grid or tray E can be slid inwardly and outwardly in respect to the carrier irrespective of the particular position in which the carrier happens to be.

Description will now be given of the mechanism which in combination with the broiler oven door enables the operator to pull the broiler grid carrier outwardly from the broiling oven or to leave the same within the broiler oven when the oven door C is opened.

A combined hinge leaf and tray operating arm L is composed of a hinge leaf portion having a forked end 38 the forks of which are suitably pivotally mounted or supported upon the regular hinge pintles which pass through the beforementioned housing-like hinge portion 37 so that the door C and the arm L are on the same pivot, whereby the movement of the door does not itself move the arm L nor the carrier F. The leaf portion of the member L has an extending arm portion 39 from which there is an outwardly extending lever arm 40 which is disposed at right angles to the arm and fork end portions 38 and 39 respectively of the member L. In its end the lever arm 40 is provided with an opening which rotatably receives a pivot pin 41 carried by a second lever arm 42 which arm in turn is pivotally connected as at 43 to the bottom of the broiler grid carrier or drawer F, all of which construction clearly appears in Figures 1 and 2 of the drawings.

A locking and lock-releasing mechanism for locking the combined hinge leaf and lever L to the broiler oven door so as to cause this member to move with the door is disposed within the chamber 21 which lies between the front and rear panels 19 and 20 respectively of the broiler door. The lock is designated as an entirety at M and is gravity operated. This lock comprises an arm 44 which is disposed in parallelism to the inner face of the door front panel 19 and has one end pivotally connected thereto as at 45. A second arm portion 46 of the lock is disposed at right angles to the first mentioned arm portion 44 and extends rearwardly and outwardly through an opening 47 in the door panel liner plate 20 and has a hooked end to form a shoulder 48. The hooked end of this arm has a rounded nose 49.

In operation with the parts in the position illustrated in Figure 2 of the drawings it will be evident that the rounded nose 49 of the lock would strike and ride over the upper edge 50 of the aforementioned arm 39 of the member L and drop down behind this arm as is possible due to the fact that the lever arm 40 is in reality made in two parts the ends of which are secured to the arm 39 in separated relationship.

When the shoulder 48 of the lock is behind the arm 39 the member L is in the position illustrated in Figure 1 of the drawings from which it will be seen that the arm 39 parallels and is in abutment with the liner 20 of the door and is securely held in such position so that the member L will move with the door just as does the hinge leaf 36.

The lock releasing mechanism is designated as an entirety at N and comprises a pair of arms 51, 52, disposed at right angles to one another to form in effect a bell crank lever. At their point of connection these arms are pivotally mounted as at 53 in the door chamber. The arm 52 is much longer than the arm 51 and at its lower end has an outwardly extending finger 54 and an oppositely and inwardly extending tongue 55. The arm 51 has a nose portion 56 which through the action of gravity would tend at all times to be in engagement with the under side or edge of the arm 44 of the leg M.

The lock releasing mechanism can well be defined as a trigger and it will be understood that if the trigger is swung to the right, that is in the direction indicated by the arrow 57, this movement will cause the arm 51 of the trigger to elevate the lock M so as to disengage the lock from the combined hinge leaf and operating arm L and will permit the broiler door to be swung from an open to a closed position or vice versa independent of the broiler pan or grid carrier F.

An opening 58 is provided in the range front immediately beneath the bottom of the broiler door opening and when the broiler door is in a closed position the tongue 55 of the trigger enters this opening and extends into the broiler chamber. The operating finger 54 extends outwardly beneath the bottom edge of the broiler door to permit it to be grasped and actuated at will by the operator of the range. Operation of the lock releasing trigger by the finger 54 is however impossible as long as the tongue 55 remains within the opening 58 and the purpose for thus locking the trigger against operation will now be explained.

It is highly desirable and important that some means be provided for exerting an inward force or pull upon the broiler door so as to normally hold it in a closed position so as to close the door as tightly as possible against the escape of heat, smoke, or fumes from the broiling chamber. In the present arrangement this is accomplished in a novel manner and will be best understood by reference to Figures 3 to 8 inclusive of the drawings.

In Figures 3 and 6 of the drawings the broiler door is illustrated as being in a closed position. It will be seen that the carrier F is in such a position that its track or runways G are positioned so that the forwardly and downwardly inclined walls 59 of their pockets 35 are resting upon the rollers 28. This positioning of the parts tends to cause the carrier F to move forwardly in a direction which is outwardly from the oven compartment. It will be further seen by reference to Figure 3 that the pivot point 43 of the arm 42 and that the pivot point 60 of the arm 40 are to one side of and forward of the pivot point 41 which is the connection between the arms 40 and 42 respectively. The pivot point 60 represents the pintle upon which the lower hinge arm of the broiler door and the arm 39 of the lever L are pivotally mounted. The tendency of the carrier to move forwardly will exert upon the arms 40 and 42 a tendency to move in the direction indicated by the arrow 61 in Figure 3 of the drawings which will cause an inward pressure to be exerted upon the broiler door. In Figure 3 of the drawings we have indicated in dotted lines the positions which the arms 40 and 42 tend to take due to the tendency of the carrier F to move outwardly. It will thus be seen that the tendency of the carrier to move outwardly reflects itself in an inward pull upon the broiler door.

In Figures 4 and 7 of the drawings the positions that the parts assume when the broiler door has been moved into a partially open position are illustrated. From these figures it will be seen that a partial outward movement of the broiler door does nothing but take up lost motion in the linkage which interconnects the broiler door with the carrier F, that is, although the broiler door has been partially opened no outward movement has as yet been imparted to the carrier F. The pivot points 41, 43 and 60 are all in alignment and on dead center and although there is the same tendency of the carrier to move outwardly this tendency has been neutralized by reason of the pivot points all being on dead center.

In Figures 5 and 8 of the drawings we have illustrated the position the parts assume after the door has been moved outwardly sufficiently far to have disengaged the trigger tongue 55 with its opening 58. By reference particularly to Figure 8 of the drawings it will be seen that the carrier F has been moved slightly forward in an outwardly direction in respect to the broiler chamber with the result that the rollers 28 are now within the pockets 35 of the carrier tracks or runways G and that there is now no tendency for the carrier to move forwardly. These members 28, 35 and G may aptly be termed as retarding members. Neither is there any tendency for the carrier to move in a rearwardly direction. With the parts in the positions illustrated in Figures 5 and 8 of the drawings the carrier will remain in the position illustrated unless further force is operated thereon in one direction or the other through the broiler door C.

If it is the desire of the range operator to pull the broiler from the compartment for inspection of the cooking operation it is only necessary to pull the door into the position illustrated in Figure 5 of the drawings which will pull the carrier outwardly into the position illustrated in Figure 1 of the drawings. If however the range operator does not wish to pull the broiler carrier outwardly from the broiling compartment it is necessary only to operate the finger 54 of the trigger by moving it to the right as indicated by the arrow 57 in Figure 2 of the drawings. This will disconnect the broiler door from the arm L and permit the broiler door to be swung outwardly free of the carrier. The carrier will remain in the position illustrated in Figure 5 of the drawings and this is important as it must remain in this position so that when the broiler door is moved to a closed position connection between the door and the arm 39 of the member L will be automatically made by the nose 49 of the lock M riding over the upper edge 50 of the arm 39 as has been previously described.

It will be seen that the trigger N cannot be operated until the parts have been moved into the position illustrated in Figure 5 of the drawings. Were it possible to operate the trigger N and disconnect the broiler door from the member L and its associated parts the member L would move or swing into such a position that the lock M would not perform its locking operation with the member L when the broiler door is returned to a closed position after having been released and moved to an open position.

The present pull-out broiler although slightly more complicated in construction is considered an improvement over the swing-out broiler appearing in the A. Stockstrom et al. Patent No. 2,027,124 dated January 7, 1936, in that with the present device it is possible to provide a broiler pan or grid having a size substantially the same as the size of the broiling compartment notwithstanding the fact that the broiler door is mounted to swing in a horizontal plane. Reference to the said A. Stockstrom et al. patent will make it clear that with a construction as there disclosed it is necessary to sacrifice the size of the broiler pan or grid in respect to the size of the broiling chamber. Due to the fact that in many ranges there is a baking oven either above or below the broiling chamber the size and configuration of the broiling chamber is largely controlled by the requirements of the baking oven.

The preceding description and accompanying drawings are to be considered merely as illustrative of one specific form which the invention may take, and it is to be understood that departures therefrom can be made without departures from the broad inventive concept and that the invention is to be limited only within the scope of the hereinafter appended claims.

We claim:

1. In a carrier operating mechanism, a range having an oven chamber provided with a door opening, a door movable to open and close said opening, a carrier horizontally movable into and out of said oven through said door opening, an arm having its inner end operatively pivotally connected to said carrier and its outer end pivotally connected to a second arm, said second arm being pivotally connected to said range adjacent the open end of said oven, a connection between said second arm and said door operative to effect the described carrier movement by movement of said door, the connection between said second arm and said door being in the form of a movably releasable interlocking member, a keeper, said interlocking member engaging the keeper which prevents movement thereof when said door is in a closed position, said interlocking member being movable with said door, said interlocking member being movable to break said door and arm connection only when said door has been opened sufficiently to disengage said member from its keeper, and said interlocking member when not establishing connection between said door and arm automatically operating to reestablish said connection upon closing said door.

2. In a range or the like, a compartment provided with an opening at one side thereof, a food and utensil carrier movable into and out of said opening, a door for said opening pivotally mounted at one side thereof and swingable in respect to said opening, means for supporting said carrier in its inward and outward movement, an arm rigidly connected to said door and pivotally mounted on said range for swinging movement with said door, a second arm pivotally connected to said carrier and pivotally connected to said first named arm, the common pivotal connection between said arms being when said door is closed toward the hinge wall side of a line passing through the hinge axis of the door and the pivotal connection of said arms to the carrier, means forming a part of said carrier support acting when said door is in a closed position to cause an outward force upon said carrier, and the stated position of the common pivotal connection of the arms acting to convert the outward force upon the carrier into a door closing torque.

3. A construction as defined in claim 2 wherein, the carrier support includes a surface which is inclined downwardly and forwardly toward the compartment opening and constitutes the means which causes an outward force to be exerted upon the carrier.

4. A construction as defined in claim 2 wherein, a quick detachable connection is provided between the door and the first named pivotally mounted arm, means acting after the door is opened and before the carrier has reached the compartment opening to hold the door and carrier against outward or inward movement, said holding means acting upon disconnection of the door from said arm to maintain the carrier and said arm against movement to assure that said door can again be readily connected to said arm when desired.

5. In a range or the like, a compartment provided with an opening at one side thereof, a food and utensil carrier movable into and out of said opening, a door for said opening pivotally mounted at one side thereof and swingable in respect to said opening, means for supporting said carrier in its inward and outward movement, an arm rigidly connected to said door and pivotally mounted on said range for swinging movement with said door, a second arm pivotally connected to said carrier and pivotally connected to said first named arm, the common pivotal connection between said arms being when said door is closed toward the hinge wall side of a line passing through the hinge axis of the door and the pivotal connection of said arms to the carrier, said carrier support including a surface which is inclined downwardly and forwardly toward the compartment opening and said carrier when resting upon said inclined surface being subjected to gravitational force tending to move the carrier outwardly, said carrier resting upon said surface when said door is in a closed position, and the stated position of the common pivotal connection of the arms acting to convert the outward force upon the carrier into a door closing torque.

6. In a range or the like, a compartment having an opening at one side thereof, a horizontally swinging door for said opening pivoted adjacent one edge thereof, a carrier movable into and out of said compartment, an arm pivotally mounted on said range adjacent the same side of said opening as the door, a second arm pivotally connected to said carrier, said arms being pivotally interconnected, and said first named arm and said door being rigidly and non-pivotally connected for the purpose described.

7. A construction as defined in claim 6 wherein, the door and the first named arm have a common pivotal point.

8. A construction such as defined in claim 6 wherein, a quick detachable connection operable from the outer side of said door is provided for interconnecting the first named arm and the door.

9. A construction as defined in claim 6 wherein, a quick detachable connection is provided for interconnecting the first named arm and the door, means exterior of the door for operating said connection, and means preventing the operation of said exterior operating means until the door has been opened a predetermined distance.

10. A construction as defined in claim 6 wherein, a quick detachable connection is provided for interconnecting the door and the first named arm, means exterior of the door for operating said connection means, means preventing the operation of said connection means until the door has been opened a predetermined distance, means for holding the carrier and the first named arm against movement after the door has been discontinued from the arm, and means for automatically causing the connection of the door with the arm after the connection has been broken by moving the door to a closed position.

11. A construction as defined in claim 5 wherein, the carrier continues to rest upon said inclined surface until the door has been opened and the carrier thereby pulled forwardly and outwardly a predetermined distance, and means acting at that time to prevent inward or outward movement of the carrier except by the application of manual force.

12. In a range or the like, a compartment provided with an opening at one side thereof, a food and utensil carrier movable into and out of said opening, a door for said opening pivotally mounted at one side thereof and swingable in respect to said opening, means for supporting said carrier in its inward and outward movement, an arm rigidly connected to said door and pivotally mounted on said range for swinging movement with said door, a second arm pivotally connected to said carrier and pivotally connected to said first named arm, means in the support of said carrier acting when said door is closed to cause a gravitational force to be exerted upon said carrier to move the carrier in an outward direction in respect to the compartment, the common pivotal connection between said arms being when said door is closed toward the hinge wall side of a line passing through the hinge axis of the door and the pivotal connection of said arms to the carrier, and said arms acting to convert the outward force upon the carrier into a door closing torque.

13. A construction as defined in claim 12 wherein, means is provided in the support of the carrier for holding the carrier against inward or outward movement when the door has been partially opened and the carrier has been pulled outwardly a predetermined distance, a lock for connecting the first named arm to the door, a trigger operable to break the locking connection between said arm and the door, and means engaging and preventing the operation of said trigger as long as the door is closed and until the door has been opened sufficiently to move the carrier outwardly the said predetermined distance.

14. In a range or the like, a compartment provided with an opening at one side thereof, a food and utensil carrier movable into and out of said opening, a door for said opening pivotally mounted at one side thereof and swingable in respect to said opening, means for supporting said carrier in its inward and outward movement, an arm rigidly connected to said door and pivotally mounted on said range for swinging movement with said door, a second arm pivotally connected to said carrier and pivotally connected to said first named arm, the common pivotal connection between said arms being when said door is closed toward the hinge wall side of a line passing through the hinge axis of the door and the pivotal connection of said arms to the carrier, said carrier having an inverted pocket including a front forwardly and downwardly extending inclined wall and a downwardly and rearwardly extending inclined rear wall, said carrier supporting means including an element engaging said pocket front wall when the carrier is in retracted position and thereby tending to cause the carrier to move outwardly under the force of gravity, the stated position of the common pivotal connection of the arms causing the arms to convert the outward force upon the carrier into a door closing torque, an interlocking element forming the connection between said first named arm and said door and being quickly operable to break said connection, a trigger for operating said element, a keeper engaging said trigger and preventing operation of said interlocking element when said door is closed but permitting operation of said element by said trigger when said door is opened a distance to cause said carrier supporting element to be positioned in the bottom of said pocket, and said positioning of said carrier supporting element in said pocket holding said carrier against movement when said interlocking element is operated to break the connection between said carrier and door and said door is swung into an open position.

15. A construction as defined in claim 14 wherein, the element of the carrier supporting means which engages the pocket is a freely rotatable roller.

16. In a range or the like, a compartment provided with an opening at one side thereof, a food and utensil carrier movable into and out of said opening, a door for said opening pivotally mounted at one side thereof and swingable in respect to said opening, means for supporting said carrier in its inward and outward movement, an arm rigidly connected to said door and pivotally mounted on said range for swinging movement with said door, a second arm pivotally connected to said carrier and pivotally connected to said first named arm, the common pivotal connection between said arms being when said door is closed toward the hinge wall side of a line passing through the hinge axis of the door and the pivotal connection of said arms to the carrier, said carrier having an inverted pocket including a front forwardly and downwardly extending inclined wall and a downwardly and rearwardly extending inclined rear wall, said carrier supporting means including an element engaging said pocket front wall when the carrier is in retracted position and thereby tending to cause the carrier to move outwardly under the force of gravity, the stated position of the common pivotal connection of the arms causing the arms to convert the outward force upon the carrier into a door closing torque.

17. In a range or the like, a compartment having an opening in one side thereof, a horizontally swinging door for said opening pivoted adjacent one edge thereof, a carrier horizontally movable into and out of said compartment, an arm pivotally mounted on a pivot common to said door and having a cross head abutting the inner side of said door, a second arm pivotally connected to said first named arm and to said carrier, a latch carried by said door and engaging the cross head of the first named arm for detachably connecting said arm to said door, and means positioned externally of the door for operating said latch to disconnect the door from said arm cross head.

18. A construction as defined in claim 17 wherein, means is provided in the travel of said carrier for holding the carrier against inward or outward movement, said latch operating means being in the form of a manually operable trigger provided with an extension, means carried by said range locking said trigger against movement by engagement with said trigger extension, and said trigger extension being free of its lock and operable when said carrier is moved to said position where it is held against inward and outward movement.

19. In a range or the like, a compartment provided at one side thereof, a food and utensil carrier movable into and out of said compartment, a door for said opening adapted to be swung in a horizontal plane, means in said compartment for supporting and guiding said carrier in its said movement, rollers for facilitating the movement of the carrier, said carrier provided with an inverted substantially V-shaped pocket, a swing arm pivoted on said range to swing in a horizontal plane, a second swing arm pivotally connected to said first swing arm and to said carrier, a latch for securing said first named swing arm rigidly and non-pivotally to said door for movement therewith, one of the walls of said carrier pocket extending downwardly and forwardly toward said compartment opening and said wall of said pocket being positioned on a roller when the door is closed and thereby causing a gravitational force to be exerted on said carrier in an outwardly direction in respect to said compartment, with the roller so positioned the common pivotal connection between said swing arms being toward the hinge wall side of a line passing through the hinge axis of the door and the pivotal connection of the swing arms to the carrier, the stated position of the common pivotal connection of the arms causing said arms to convert the outward force upon the carrier into a door closing torque, said inverted pocket acting when said door has been moved to a partly open position and has moved the carrier slightly forward to hold the carrier in a stationary position, a manually operable trigger for releasing the locking connection between the door and the first named swing arm when the carrier is positioned as last named to permit the oven door to be opened independent of the swing arm and carrier, and said lock operating to automatically re-engage and re-lock the said swing arm when the oven door is returned to a closed position.

HENRY MOECKER, Jr.
WILLIAM LOTTER.